Sept. 8, 1931.  L. I. SWAYNE  1,822,325
RUNWAY JACK
Filed Aug. 12, 1929   3 Sheets-Sheet 1
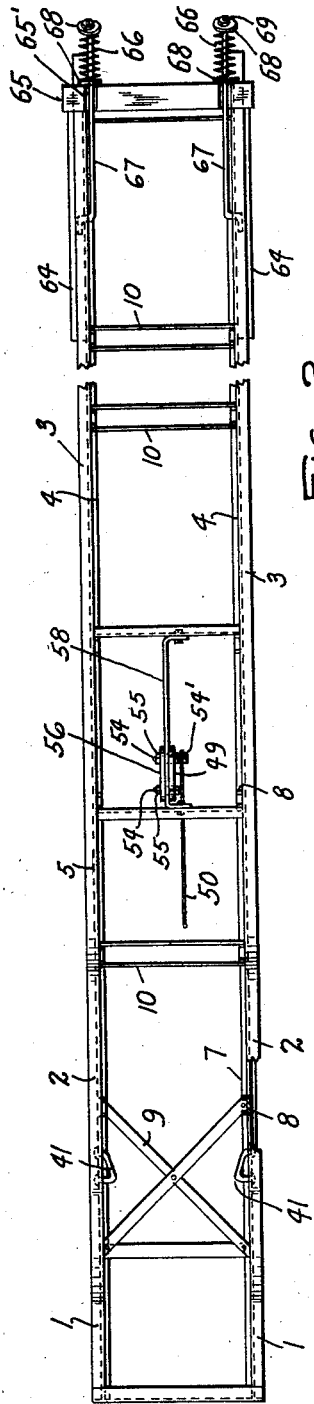
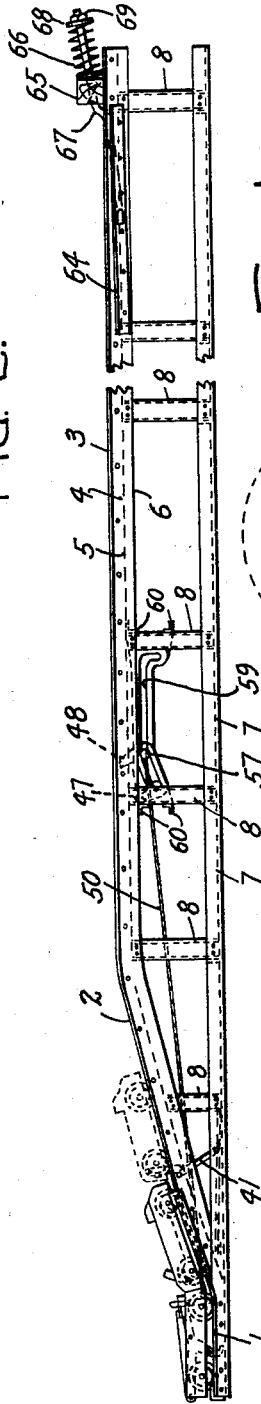
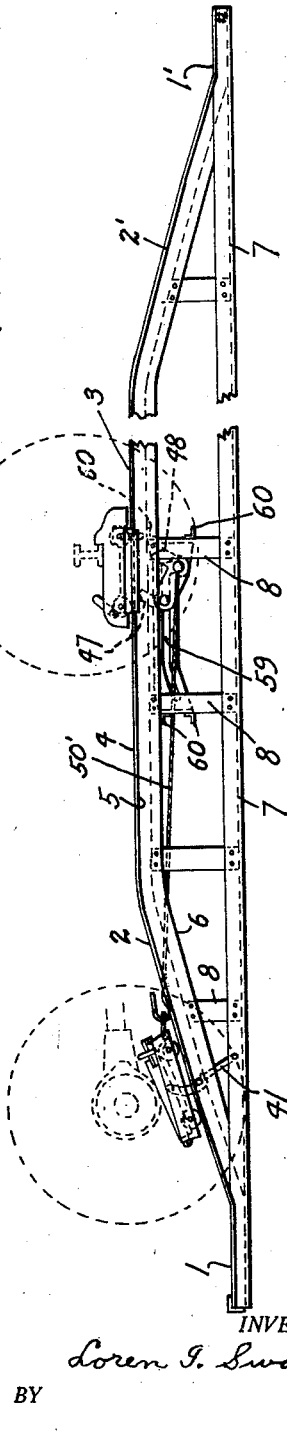
INVENTOR.
Loren I. Swayne
BY
Rolland S. Trott
ATTORNEY.

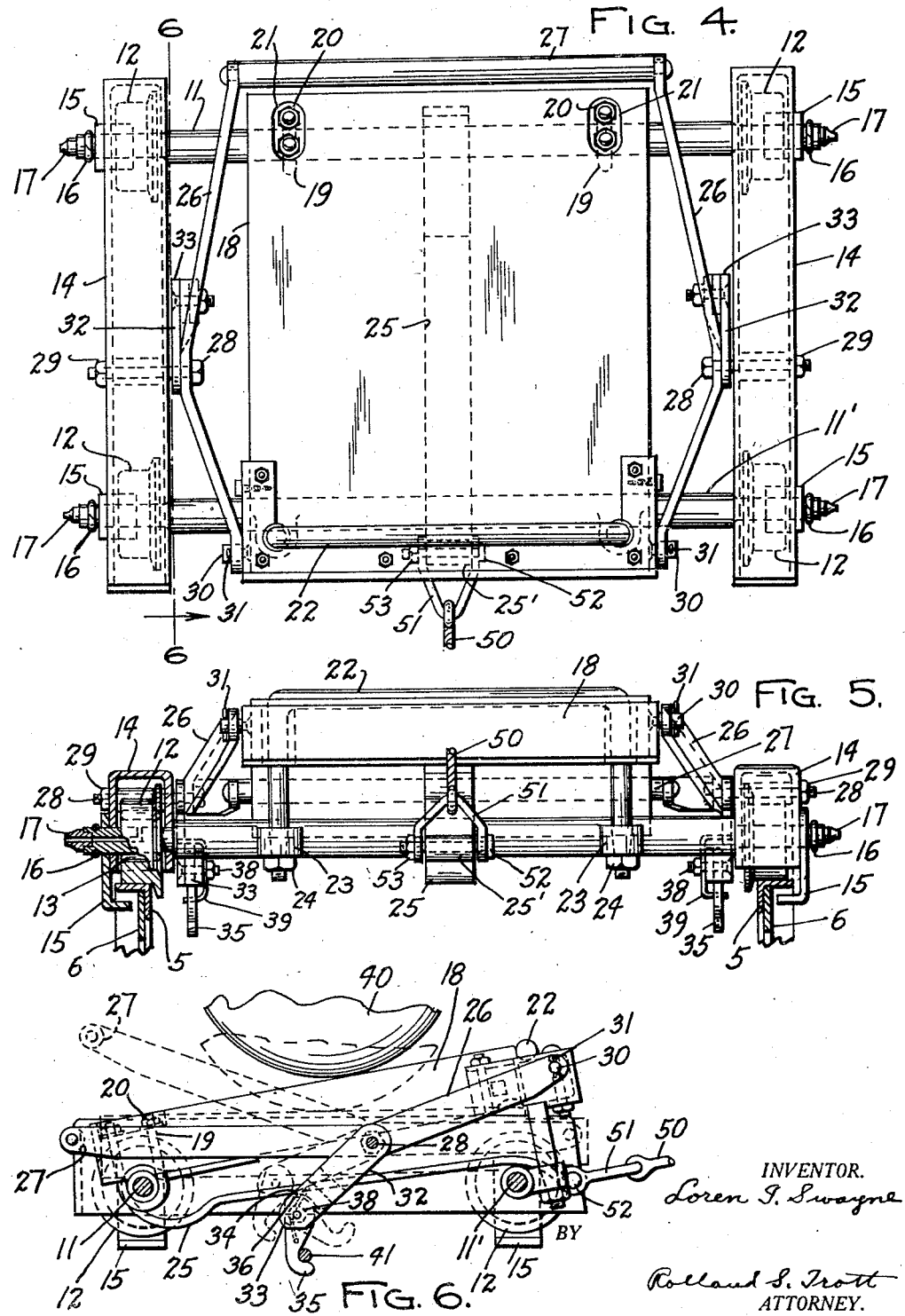

Patented Sept. 8, 1931

1,822,325

UNITED STATES PATENT OFFICE

LOREN I. SWAYNE, OF DENVER, COLORADO

RUNWAY JACK

Application filed August 12, 1929. Serial No. 385,216.

My invention relates to runway jacks and is an improvement over my former invention, application for Letters Patent on which was filed May 1st, 1928, the serial number being 274,314.

The object of my present invention is to provide a runway jack of simplified construction.

A further object is to provide an improved rear carriage construction, whereby the forward movement of the rear carriage out from under the differential housing of the automobile will be prevented.

A further object is to provide a rear carriage and track construction whereby even excessive speed of driving the automobile upon the jack will not be able to move the rear carriage too far up the incline, and whereby it will be positively stopped at a predetermined point upon the incline, which point it can pass only after the weight of the differential is upon it.

A further object is to provide an improved tractor construction.

A further object is to provide an improved brake construction to stop the movement of the car on the jack.

A further object is to provide an improved bumper construction to act in addition to the brake in extreme cases.

I attain the above objects by a construction which is fully described below and which is illustrated in the drawings, in which:—

Figure 1 is a side elevation of my runway jack with the carriages in the down position ready to receive an automobile.

Figure 2 is a plan view of the jack with the carriages and part of the tractor cable removed.

Figure 3 is a fragmentary side elevation showing the carriages as they would appear at the instant the differential of the automobile is about to contact with the rear carriage, and showing a modified form of tractor connection and of track.

Figure 4 is a top elevation of the rear carriage and part of the tractor cable.

Figure 5 is a front elevation in partial section of the rear carriage, part of the tractor cable and part of the track in section.

Figure 6 is a section of the rear carriage on the line 6—6 of Figure 4, and showing a section of the stirrup in place.

Figure 7:
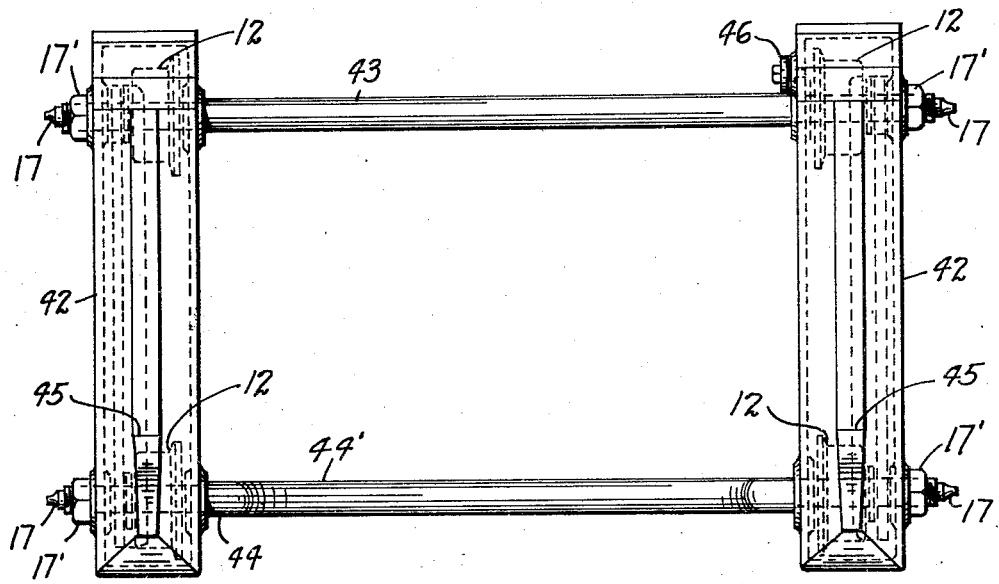
Figure 7 is a top elevation of the front carriage.

The runway of my improved runway jack is composed of the two tracks 4, each having the lower flat 1, the incline 2, and the upper flat 3. The two tracks 4 are each composed of the angle 5 and the beam member 6, which are riveted or otherwise properly joined together. The tracks are supported on the base members 7 by the uprights 8 and are cross braced by braces such as at 9 and 10, all of which makes a strong but light and cheap construction.

The rear carriage is provided with the axles 11 and 11' and wheels 12 mounted thereon by the roller bearings 13.

A track hook 15 is integral with or may be properly attached to each side member adjacent each axle, or the axle may pass directly through the hook as shown.

The side members are held in place on the axles by the snap rings 16 which slip over each axle end and snap into a groove adjacent the side member. Each axle end is provided with the grease fitting 17.

The hooks 15 pass down outside of the tracks and bend in under the horizontal flanges of the angles 5, thus positively preventing the carriage from leaving the tracks, while in no way intereferring with the normal movement of the carriage on the tracks.

The platform 18 is attached to the rear axle 11 by the U-bolts 19, nuts 20 and washers 21.

The large U-shaped bracket 22 is held in the lugs 23 of the front axle 11' by the nuts 24. The vertical arms of the bracket 22 pass freely through holes in the platform 18, and the upward movement of the front end of the platform is limited by contact with the horizontal portion of the bracket 22.

The platform spring 25 passes partially about the rear axle and its front end rests upon the front axle, while its other end contacts with the under surface of the platform 18 and holds it resiliently against the bracket 22. The front extremity of the spring 25 is formed into an eye 25' as will be taken up more fully below.

The platform levers 26 are joined by the cross bar 27 and are pivotally mounted by the bolts 28 on the side members 14, the bolts 28 being held in place by the nuts 29.

The front ends of the levers 26 are pivotally mounted by the pins 30 upon the front end of the platform 18, being held thereon by the cotter pins 31.

The levers 26 are provided with arms 32 having bifurcated lower ends 33 having a contact surface 34.

The hooks 35, having the contact surfaces 36 are pivotally mounted on the ends 33 by the bolts 37, held in place by the nuts 38.

The springs 39, also held in place on the bolts 37 by the nuts 38 engage the hooks 35 and the arms 32 and hold the contact surfaces of the hooks against the contact surfaces of the arms acting against forward swinging of the hooks 35.

When the differential 40 of the rear axle of the automobile encounters the platform 18, it causes the platform to lower about the rear axle 11 as a center, and against the pressure of the spring 25 till the platform encounters the front axle 11'. In this position the bracket 22 extends up above the surface of the platform 18, effectually preventing the differential from moving forward and off of the platform 18.

The downward pivotal movement of the platform 18 acts upon the levers 26 and the cross bar 27 to move them to the dotted line position shown in Figure 6. At the same time the arms 32 with their hooks 35 are moved to the dotted line position shown in Figure 6.

When the rear carriage is moved to the receiving position shown in Figure 3, the hooks 35 are nearly in contact with the stirrups 41.

Should the rear carriage be moved to the receiving position at too high a rate of speed its inertia might carry it so far up the incline that the differential of the rear axle would merely bump it further forward instead of riding upon it.

The stirrups 41 prevent this inertia effect, which is much more common than would be supposed when a runway jack is being used continuously in a busy garage or shop.

However, when the hooks 35 encounter the stirrups 41, the rear carriage is stopped and held in the receiving position positively and regardless of the speed with which it moves up the incline. And it may only pass forward when the contact of the differential of the rear axle on the platform 18 depresses the platform and raises the hooks 35 to clear the stirrups, as shown by dotted lines in Figure 6.

This same pivotal movement of the levers 26 raises the cross bar 27 behind the differential 40 so as to prevent the rear carriage from suddenly moving forward out from under the differential, especially with high speed operation of the runway jack.

That is, the hooks 35 positively prevent the rear carriage from moving forward past the receiving position until the weight of the differential is upon the platform 18; and once the weight of the differential is upon the platform, the bracket 22 in front, and the cross bar 27 at the rear prevent the jarring or bumping of the differential from the platform in either direction.

When the rear carriage is moved backward to the down position shown in Figure 1, and the hooks 35 encounter the stirrups 41, pivotal movement of the hooks 35 about their mounting bolts 37 against the pressure of the springs 39 permits the carriage to move on backward past the stirrups 41.

The front carriage has side members 42 in which are mounted the rear axle 43 and the front axle 44, each shoulder of each axle bearing against the adjacent side member.

The sleeves 12' are received upon the reduced ends of each axle and between the walls of each side member, the nuts 17' on the axles acting to clamp the axles and side members firmly together.

In the normal down position shown in Figure 1, the front carriage is held in position upon the incline by the rear carriage.

The front axle of the automobile contacts with the off-set 45, which forces the carriage up the incline, raising the front wheels of the automobile off the floor.

Figure 8:
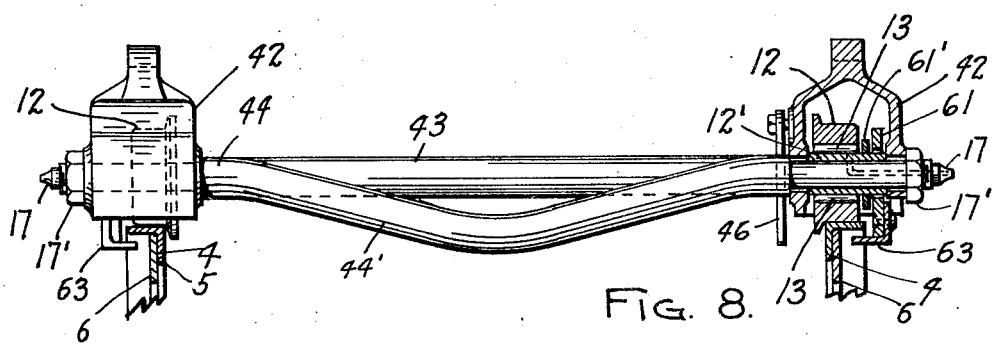
Figure 8 is a front elevation in partial section of the front carriage and part of the track in section.

When a vehicle with an exceptionally high front axle is encountered, the dog 46 is turned downward from the position shown in Figures 1 and 3 to the position shown in Figures 7 and 8 and as shown by the dotted line front carriage in Figure 1. Then the front carriage is moved by hand up the incline to the position shown by dotted lines in Figure 1, the dog 46 contacting with the stirrup 41 after it has passed over it, and holding the front carriage higher on the incline than its normal position so that it will contact with the exceptionally high front axle. This position is shown in dotted lines in Figure 1.

The front axle 44 is dropped as at 44' so that it will contact in its movements back and forth on the track with the rear and front arms 47 and 48 respectively of the tractor arm plate 49.

The tractor arm plate 49 is connected by a cable 50 to the clevis 51 which is mounted by the bolt 52 and nut 53 in the eye of the spring 25 of the rear carriage.

The tractor is composed of two plates held by shouldered bolts 54 and nuts 55 on either side of the cam track 58, the arm plate 49 having the arms 47 and 48, and the retainer plate 56 being without arms. Roller sleeves 57 are carried by the bolts 54 and serve to decrease the friction of the bolts as they traverse the cam slot 59.

The track 58 is properly mounted on the cross angles 60 extending between properly positioned uprights 8.

The short distance between the arms 47 and 48 and the drop of the slot 59 at either end of the track 58 combine to provide a front and a rear position for the tractor such as shown in Figures 3 and 1 respectively.

In the front position the front arm 48 is low enough to permit the dropped front axle of the front carriage to pass over it, while the rear arm 47 is high enough to contact with the dropped axle and be thereby moved to the rear position.

In the rear position, the rear arm 47 is low enough to permit the dropped axle to pass over it but the arm 48 contacts with the dropped axle which moves the tractor forward and thereby, through the cable connection moves the rear carriage forward to the receiving position shown in Figure 3, with the hooks 35 adjacent the stirrups 41.

That is, in either movement of the tractor, the arm which is contacting the dropped axle of the front carriage, drops down at the end of the movement to permit the dropped axle to continue on its course.

The drop of the cam slot 59 at the front of the track 58 is abrupt enough to hold the rear carriage in the receiving position on the incline.

The brake plates 61 are provided with the slots 62 rising from the rear to the front and having a slight notch in the lower wall of the front portion of each slot as shown for the reception of the axles of the front carriage. The washer 61' acts to separate each wheel 12 from the adjacent plate 61.

The brake shoes 63 are preferably riveted to the brake plates and extend inward under the horizontal flanges of the angles 5 of the tracks and perform the same duty as the hooks 15 of the rear carriage.

At the forward end of the runway are attached the brake slides 64 which are on a slightly rising angle with respect to the top of the angles 5.

Figure 9:
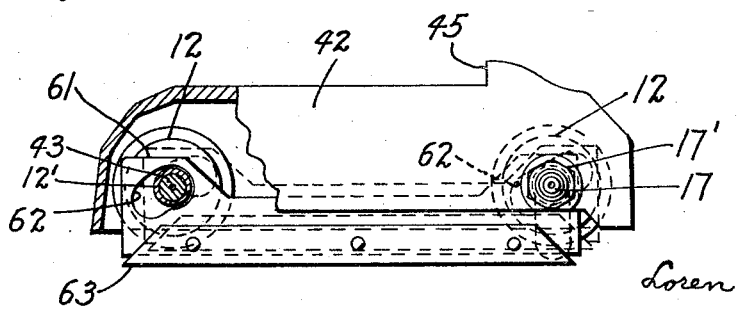
Figure 9 is a side elevation in partial section of the front carriage.

As the front carriage moves forward with the brake shoes in the full line position of Figure 9, the brake shoes contact with the upper surface of the brake slides, which contact is constantly increased by further forward movement due to the rise of the slides. This brake effect causes the wheels of the carriage to gradually rise from contact with the angles 5 and the entire weight of the front end of the vehicle is then carried by the shoes 63 as they slide on the slides 64.

Under all ordinary circumstances the brake effect thus produced is enough to bring the vehicle to rest upon the runway.

When it is desired to back the vehicle off the runway, a slight backward push is all that is required to move the axles of the carriage backward in the slots 62 and this permits the wheels to drop into contact with the angles 5 again, so the vehicle may be rolled backward on the carriages.

For positively stopping the vehicle on the runway when it is driven upon it so fast that the brake provided is not enough to stop it, the bumper 65 is provided. This is preferably made of some hard wood. It rests upon the top of the angles 5, and is held in place resiliently by the springs 66, washers 68 and nuts 69, mounted upon the bumper rods 67, which rods pass through the slots 65' in the bumper 65 and are pivotally mounted on the runway as shown in Figures 1 and 2.

The angle of the rods 67 combines with the springs to force the bumper down upon the angles 5 when the bump with the front carriage occurs, and this tends to further assist in stopping the movement of the vehicle on the runway by providing friction between the angles 5 and the bumper 65. In extreme cases what occurs is that the entire runway skids along the floor a short distance after the movement of the vehicle on the runway has been stopped.

If desired, the rear carriage may be equipped with brake plates and shoes similar to those of the front carriage, but extending downward a greater distance to contact with brake slides similar to those which co-operate with the front carriage brakes, but which are mounted on the track framework at a lower level than the front slides so that the brakes of the front carriage will pass over the slides which co-operate with the rear carriage. This is not illustrated in the drawings, for the sake of clearness, but any mechanic will perceive the construction necessary to equip the runway jack with brakes on both carriages.

However, from my own experience with my runway jack, I believe the brakes as shown will provide all the brake effect required, especially when the final stop is insured by the bumper.

In some shops it may be desired to drive the cars in a continuous line over the runway jack, in which case the modified form shown in Figure 3 may be used. The cable 50 is replaced by the hooked tractor rod 50'; the bumper rods 67 are swung upward out of the slots 65', the bumper is removed and the rods 67 are then allowed to drop down out of the way. It will be observed that after the slides 64 have stopped the forward movement of a vehicle and the vehicle has been pushed backward till the brakes are released, it may then be moved either backward or forward on the tracks.

When using the modified form of track shown in Figure 3, the vehicle is pushed backward till the brakes are released and is then pushed forward and down the front incline 2', to the lower flat 1'.

The carriages will roll off of the lower flat 1' to the floor and the vehicle may then be driven away. The carriages may then be carried or pushed by hand backward on the track to the starting position shown in Figure 1, ready for the next vehicle. When the vehicle is pushed forward down the front incline, the rear carriage is released from the tractor rod 50' by merely passing forward so that the clevis 51 slides out of engagement with the hook of the rod 50'. When my runway jack is equipped with the front incline, and in without the bumper, should a vehicle be driven upon the runway at too high a speed to be stopped by the brake, it will merely continue on forward and move down the front incline and down upon the floor again without damage.

The jack with the front incline may be made as long as desired, so that it will carry several vehicles at once, each equipped with a front and a rear carriage, and moving forward only, upon the runway.

With such a long jack, the carriages may be returned to the rear or starting end by placing them upon a long incline similar to but with a lower grade than the incline 2.

Or, if the floor space and general arrangement of the shop or garage will permit and the amount of business will warrant, two long runway jacks with front inclines may be placed near and parallel to each other but facing in different directions, so that the carriages left at the bottom of each front incline may be moved over and placed upon the rear incline of the adjoining runway, ready for the next vehicle.

All of the various methods and arrangements for the use of my runway jack will be perceived by any competent mechanic once the details of the construction have been disclosed to him and he will be able to employ the runway jack in a manner and form best suited to his particular requirements.

From all of the above it will be seen that my runway jack attains all the objects sought.

Having now described my invention, what I claim as new, and desire to protect by Letters Patent, is as follows:—

1. In a runway jack having a two rail track provided with an inclined portion provided with hook-contacting stirrups and leading up to a level portion, and front and rear four-wheeled carriages mounted on said track to receive the front and rear axles respectively of a vehicle driven upon said jack, a longitudinally movable tractor mounted on the runway jack and operated by contact with said front carraige, a rear carriage movable up the incline to a receiving position by forward movement of the tractor, and composed of front and rear wheeled axles joined by side members, an upwardly extending U-shaped bracket mounted on the front axle, a platform secured to the rear axle and extending between the front axle and said bracket, a spring resiliently holding the forward portion of the platform up in contact with said bracket, levers pivotally mounted upon said side members and upon the front portion of said platform and having rear extensions, a cross piece joining the rear extensions of said levers and normally substantially flush with the upper surface of said platform, stirrup-contacting hooks normally depending from and pivotally mounted on said levers to have forward pivotal movement only with respect to said levers from said normal position, and springs resiliently holding said hooks in said normal position.

2. In the rear carriage of a runway jack having a hook-contacting stirrup on the runway, front and rear wheeled axles joined by side members to form a carriage, an upwardly extending bracket mounted at the front end of the carriage, a platform secured to the rear portion of the carriage, a spring resiliently holding the forward portion of the platform up in contact with said bracket, levers pivotally mounted upon said side members and connected to the front portion of said platform and having rear extensions and a cross piece normally substantially flush with the upper surface of the platform connecting them, a stirrup-contacting hook normally depending from and pivotally mounted on one of said levers to have forward pivotal movement only with respect to said lever from said normal position, and a spring resiliently holding said hook in said normal position, whereby contact between the stirrup and the hook will prevent further forward movement of the carriage on the runway, and depression of the platform about its rear mounting will raise the hook out of engagement with said stirrup and permit forward movement of the carriage and will raise the said cross piece above the level of the upper surface of the platform.

3. In a runway jack having hook-contacting stirrups on the runway, a rear carriage composed of front and rear wheeled axles joined by side members, a bracket at the front of the carriage, a platform, means mounting the platform adjacent the rear of the carriage and permitting pivotal movement thereof, means holding the front portion of the platform up and in resilient contact with said bracket, levers pivotally mounted on said side members and at their forward ends connected to the forward portion of said platform, a cross piece connecting the rear ends of said levers and normally substantially flush with the upper surface of said platform, stirrup-contacting hooks pivotally mounted on the levers at the rear of their mounting on the side members and normally extending downwardly and having only forward pivotal movement with respect to said levers, springs resiliently holding said hooks in their normal position, and draft means to move the carriage forward on the runway and the said hooks adjacent the said stirrups.

4. In the tractor mechanism of a runway jack having front and rear carriages and adapted to be operated by contact of the tractor mechanism with the front carriage thereof to move the rear carriage up the incline of said runway jack to a receiving position in the line of travel of the differential of an automobile, a track mounted on the runway and having upper and lower spaced rails providing a guideway between them and having downwardly extending portions at each end, an arm plate having an upwardly extending arm at each end thereof on one side of said track, a retainer plate on the opposite side of said track, means joining the plates to move as a unit and passing through said guideway to be guided thereby, and draft means attached to said plate unit to move the rear carriage forward upon the forward movement of said unit.

5. In the tractor mechanism of a runway jack having front and rear carriages, adapted to be operated by contact with the front carriage thereof and to move the rear carriage up the incline of said runway jack to a receiving position, a track mounted on the runway and having upper and lower spaced rails providing a guideway therebetween and having downwardly extending portions at each end, an arm plate adjacent one side of the said track having an upwardly extending arm at each end thereof, each arm adapted when not at its end of the track to contact with a part of said front carriage, means on the opposite side of said track and passing through said guideway and guided thereby attached to said arm plate to form therewith a plate unit, and draft means attached to said plate unit and having a draft connection with the rear carriage to move the rear carriage forward upon the forward movement of the plate unit.

6. In a runway jack having front and rear wheeled carriages provided with front and rear axles joined by side members for the reception of the front and rear axles respectively of vehicles, and having parallel rails upon which said carriages may move from the rear to the front thereof, brake slides attached to said rails on a rising grade from the rear to the front, and a pair of brake-slide-contacting brake shoes having slots inclined from the rear to the front and with a notch in the lower wall of the front portion of each slot, and mounted by said slots upon the axles of one of said carriages.

7. In a runway jack having front and rear wheeled carriages provided with front and rear axles joined by side members for the reception of the front and rear axles respectively of vehicles, and having parallel rails upon which said carriages may move from the rear to the front thereof, brake slides attached to said rails on a rising grade from the rear to the front, and a pair of brake-slide-contacting brake shoes having slots inclined from the rear to the front, the brake shoes being mounted upon parts of one of said carriages which pass through said slots.

8. In a runway jack, the combination of front and rear wheeled carriages provided with front and rear axles joined by side members, for the reception of the front and rear axles respectively of vehicles, parallel rails upon which said carriages may move from the rear toward the front thereof, brake slides attached to said rails on a rising grade from the rear to the front, a pair of brake-slide-contacting brake shoes having slots inclined from the rear to the front and with a notch in the lower wall of the front portion of each slot, mounted by said slots upon parts of said front carriage, side rods pivotally attached to the said rails, a cross member freely resting upon the rails adjacent the front extremities of the brake slides and through which said side rods extend, springs on the side rods and bearing against the cross member and means on the side rods and contacting the front ends of the said springs.

9. In a runway jack, the combination of front and rear wheeled carriages, parallel rails upon which said carriages may move from the rear to the front, brake slides attached to the rails on a rising grade from the rear to the front, brake-slide-contacting brake shoes having slots inclined from the rear to the front and with a notch in the lower wall of the front portion of each slot, mounted by said slots upon parts of said carriages, side rods pivotally mounted on said rails adjacent their front ends, a cross member on said side rods and resting freely on said rails adjacent their front ends, springs on the side rods and means on the side rods to prevent the forward movement of said springs, whereby the brake slides and the cross member will combine to stop forward movement of the front carriage.

10. In a runway jack, the combination of front and rear wheeled carriages, parallel rails upon which said carriages may move from the rear to the front, brake slides attached to the rails on a rising grade from the rear to the front, brake-slide-contacting brake shoes carried by the front carriage, and a cross member resting freely upon said rails adjacent the ends of the rails and the ends of the brake slides and means attached to the rails resiliently preventing forward movement of the cross member, whereby the brake slides, brake shoes and cross member will stop the forward movement of the front carriage.

11. In a runway jack, the combination of front and rear wheeled carriages, parallel rails upon which said carriages may move from the rear to the front, brake slides attached to the rails on a rising grade from the rear to the front, brake-slide-contacting brake shoes having slots inclined from the rear to the front and with a notch in the lower wall of the front portion of each slot, mounted by said slots upon parts of said carriages, and a normally stationary bumper attached to the rails and co-acting with the brake slides and shoes in stopping the forward movement of the front carriage.

In testimony whereof I affix my signature.

LOREN I. SWAYNE.